US008844986B2

United States Patent
Kaneko et al.

(10) Patent No.: US 8,844,986 B2
(45) Date of Patent: Sep. 30, 2014

(54) VEHICLE BUMPER APPARATUS AND CRUSH BOX THEREOF

(71) Applicants: Aisin Seiki Kabushki Kaisha, Kariya (JP); Aisin Keikinzoku Kabushiki Kaisha, Imizu (JP)

(72) Inventors: Takanobu Kaneko, Kariya (JP); Kiyoichi Kita, Okazaki (JP); Tamaki Obayashi, Toyama (JP); Kyosuke Matsui, Chiryu (JP)

(73) Assignees: Aisin Seiki Kabushiki Kaisha, Kariya-shi (JP); Aisin Keikinzoku Kabushiki Kaisha, Imizu-shi (JP)

( * ) Notice: Subject to any disclaimer, the term of this patent is extended or adjusted under 35 U.S.C. 154(b) by 0 days.

(21) Appl. No.: 13/653,695

(22) Filed: Oct. 17, 2012

(65) Prior Publication Data
US 2013/0099514 A1    Apr. 25, 2013

(30) Foreign Application Priority Data

Oct. 21, 2011  (JP) .................................. 2011-231568

(51) Int. Cl.
*B60R 19/34* (2006.01)
*B60R 19/24* (2006.01)
(52) U.S. Cl.
CPC ........... *B60R 19/34* (2013.01); *B60R 2019/247* (2013.01)
USPC .. 293/133; 293/155; 296/187.09; 296/193.09
(58) Field of Classification Search
USPC .................... 293/132, 133, 154, 155; 296/29, 296/187.03, 187.09, 193.09, 203.02
See application file for complete search history.

(56) References Cited

U.S. PATENT DOCUMENTS

| 6,698,809 | B2 * | 3/2004 | Stol et al. ....................... | 293/133 |
| 7,290,811 | B1 * | 11/2007 | Arns .............................. | 293/133 |
| 7,448,658 | B2 | 11/2008 | Takagi et al. | |
| 7,793,997 | B2 * | 9/2010 | Karlander ..................... | 293/133 |
| 8,079,624 | B2 * | 12/2011 | Roll et al. ..................... | 293/102 |
| 8,317,240 | B2 * | 11/2012 | Muller et al. ................. | 293/132 |
| 8,469,415 | B2 * | 6/2013 | Haneda et al. ................ | 293/102 |
| 2001/0013706 | A1 * | 8/2001 | Artner .......................... | 293/133 |
| 2005/0067845 | A1 * | 3/2005 | Frank ........................... | 293/133 |
| 2008/0185851 | A1 * | 8/2008 | Evans et al. ................... | 293/120 |
| 2010/0090481 | A1 * | 4/2010 | Nilsson ........................ | 293/155 |
| 2010/0194125 | A1 * | 8/2010 | Wibbeke et al. .............. | 293/120 |

FOREIGN PATENT DOCUMENTS

| JP | 2006-176093 | 7/2006 |
| JP | 2009-83529 | 4/2009 |

* cited by examiner

*Primary Examiner* — Glenn Dayoan
*Assistant Examiner* — Jason S Daniels
(74) *Attorney, Agent, or Firm* — Oblon, Spivak, McClelland, Maier & Neustadt, L.L.P.

(57) ABSTRACT

A vehicle bumper apparatus includes a bumper reinforcement member formed to have a hollow cross section and including a vehicle interior portion formed to have an open cross section including an opening, and a crush box supporting the bumper reinforcement member to mount the bumper reinforcement member to a side member of a vehicle body, the crush box including a connecting portion arranged at a vehicle exterior portion, the connecting portion closing the opening of the bumper reinforcement member to restrict the opening from being expanded, and a retaining portion protruding from the connecting portion toward an exterior side of a vehicle to retain the bumper reinforcement member.

7 Claims, 7 Drawing Sheets

VEHICLE BUMPER APPARATUS AND CRUSH BOX THEREOF

CROSS REFERENCE TO RELATED APPLICATIONS

This application is based on and claims priority under 35 U.S.C. §119 to Japanese Patent Application 2011-231568, filed on Oct. 21, 2011, the entire content of which is incorporated herein by reference.

TECHNICAL FIELD

This disclosure generally relates to a vehicle bumper apparatus and a crush box of the vehicle bumper apparatus.

BACKGROUND DISCUSSION

A known vehicle bumper apparatus is disclosed in JP2009-83529A (which will be referred to as Reference 1). In the vehicle bumper apparatus disclosed in Reference 1, a bumper reinforcement member (bumper reinforcement) formed in an elongated shape is mounted to side members of a vehicle body by crush boxes and is supported thereby. The bumper reinforcement member extends in a width direction of a vehicle (in a vehicle width direction). The crush boxes are crushed, for example, by a load in a front-rear direction of the vehicle (in a vehicle front-rear direction) and therefore absorb an impact energy generated by the load.

In the vehicle bumper apparatus disclosed in Reference 1, the bumper reinforcement member has a hollow cross section. In addition, an interior portion (a vehicle interior portion) of the bumper reinforcement member in the vehicle front-rear direction is formed so as to have an open cross section including an opening. Reinforcement members for restricting the opening of the bumper reinforcement member from being expanded are arranged at attaching portions (to which the crush boxes are attached) of the bumper reinforcement member so as to close the opening. According to such configuration of the vehicle bumper apparatus of Reference 1, the bumper reinforcement member is downsized in weight and the strength thereof (against load) is increased. However, the reinforcement members that are separate components from the bumper reinforcement member and the crush boxes need to be additionally applied to the vehicle bumper apparatus of Reference 1. As a result, weight and cost increases resulting from the addition of the separate components are unavoidable in the vehicle bumper apparatus of Reference 1.

A need thus exists for a vehicle bumper apparatus and a crush box of the vehicle bumper apparatus, which are not susceptible to the drawbacks mentioned above.

SUMMARY

According to an aspect of this disclosure, a vehicle bumper apparatus includes a bumper reinforcement member formed to have a hollow cross section and including a vehicle interior portion formed to have an open cross section including an opening, and a crush box supporting the bumper reinforcement member to mount the bumper reinforcement member to a side member of a vehicle body, the crush box including a connecting portion arranged at a vehicle exterior portion, the connecting portion closing the opening of the bumper reinforcement member to restrict the opening from being expanded, and a retaining portion protruding from the connecting portion toward an exterior side of a vehicle to retain the bumper reinforcement member.

According to another aspect of the disclosure, a crush box arranged between a side member of a vehicle body and a bumper reinforcement member formed to have a hollow cross section and including a vehicle interior portion formed to have an open cross section including an opening, the crush box including a connecting portion closing the opening to restrict the opening from being expanded, and a retaining portion protruding from the connecting portion to an exterior side of the vehicle to retain the bumper reinforcement member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
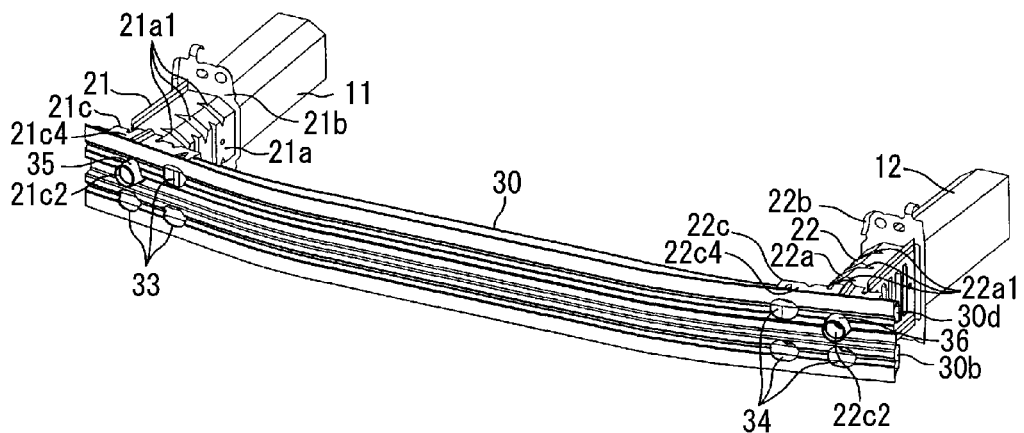
FIG. 1 is a front perspective view of a vehicle bumper apparatus according to a first embodiment disclosed here.

A first embodiment of this disclosure will be explained as follows with reference to the illustrations of the attached drawings. Each of FIGS. 1 to 10 illustrates a vehicle bumper apparatus according to the first embodiment of the disclosure. The vehicle bumper apparatus according to the first embodiment is arranged at a front side of a vehicle. The vehicle bumper apparatus is configured so that a bumper reinforcement member 30 having an elongated shape is mounted and supported by crush boxes 21, 22 (provided in a planar symmetric pair in a width direction of a vehicle) to side members 11, 12 (provided in a planar symmetric pair in the width direction of the vehicle) of a vehicle body of the vehicle. The bumper reinforcement member 30 and the crush boxes 21, 22 are made of aluminum alloy. In addition, the side members 11, 12 of the vehicle body are arranged at lateral side portions in the width direction of the vehicle (in a vehicle width direction). Each of the side members 11, 12 has a relatively high rigidity in a front-rear direction of the vehicle (in a vehicle front-rear direction), compared to rigidities of other portions of the vehicle body in the vehicle front-rear direction.

The crush boxes 21, 22 are crushed by a load in the vehicle front-rear direction and therefore absorb an impact energy caused by the load. The crush boxes 21, 22 are arranged at front sides of the side members 11, 12, respectively, so as to extend along the vehicle front-rear direction. The crush boxes 21, 22 include main body portion 21a, 22a each formed in a tubular shape, vehicle body attaching portions 21b, 22b, and bumper attaching portions 21c, 22c. The main body portions 21a, 22a are arranged at respective intermediate portions of the crush boxes 21, 22 in the vehicle front-rear direction. The vehicle body attaching portions 21a, 22a are arranged at respective rear sides (first end portions) of the main body portions 21a, 22a and are fixedly attached thereto. The bumper attaching portion 21c, 22c are arranged at respective front sides (second end portions) of the main body portions 21a, 22a and are fixedly attached thereto.

The main body portions 21a, 22a are formed so as to have polygonal shapes (hexagonal shapes) in vertical cross sections. Plural beads 21a1, 22a1 are arranged at desired portions of the main body portions 21a, 22a, respectively. The vehicle body attaching portions 21b, 22b are fixed by welding to respective rear end portions of the main body portions 21a, 22a and are attached to respective front end portions of the side members 11, 12 (see FIG. 1). The bumper attaching portions 21c, 22c are fixed by welding to respective front end portions of the main body portions 21a, 22a. In addition, the bumper attaching portions 21c, 22c are attached to the bumper reinforcement member 30, respectively, by three bolts 31 and three nuts 21c1 that are used in pairs and by three bolts 32 and three nuts 22c1 that are used in pairs (see FIGS. 2 to 4).

The nuts 21c1, 22c1 are fixed by welding to respective rear surfaces of the bumper attaching potions 21c, 22c. The bolts 31, 32 are screwed with the nuts 21c1, 22c1 through bolt insertion holes 33, 34 formed in the bumper reinforcement member 30; thereby, the crush boxes 21, 22 are integrally connected to the bumper reinforcement member 30. In addition, according to the first embodiment, fixing nuts 21c2, 22c2 that may be fitted to fixing hooks are fixed by welding to the bumper attaching portions 21c, 22c (see FIGS. 9 and 10) and are inserted in insertion holes 35, 36 formed in the bumper reinforcement member 30 (see FIGS. 1, 9, and 10).

The bumper reinforcement member 30 is arranged along the vehicle width direction and is supported by the symmetric pair of crush boxes 21, 22 arranged in the vehicle width direction. The bumper reinforcement member 30 is formed from an extrudate having a hollow in a vertical cross section (i.e., the extrudate having a closed cross section), and cut portions N (see FIGS. 3 and 4) are formed in predetermined portions at right and left end portions of the extrudate (the right and left end portions including attachment portions configured to be attached to the crush boxes 21, 22). The right and left end portions of the extrudate are pressed to be thereby processed into a predetermined shape (i.e., the bumper reinforcement member 30 is formed from the extrudate so as to have right and left end portions curved toward a rearward direction of the vehicle, and an intermediate portion linearly extending substantially along the vehicle width direction). As a result, the bumper reinforcement member 30 is formed from the extrudate so as to have the thickness gradually decreasing toward the right and left end portions and being substantially uniform at the intermediate portion.

The cut portions N are formed at the predetermine portions of the right and left end portions of the bumper reinforcement member 30 as described above. Therefore, the bumper reinforcement member 30 is configured so that the attachment portions configured to be attached to the crush boxes 21, 22 have hollow cross sections (see FIGS. 3, 4, 9, and 10). In addition, a rear end (an interior portion serving as a vehicle interior portion) of bumper reinforcement member 30 in the vehicle front-rear direction is formed so as to have open cross sections including openings A at the attachment portions configured to be attached to the crush boxes 21, 22. Moreover, according to the first embodiment, the bumper reinforcement member 30 is formed from the extrudate having the vertical cross section that corresponds to the closed cross section. Alternatively, the bumper reinforcement member 30 may be formed from an extrudate having a vertical cross section that includes an opening (A) opened along an entire length of the extrudate (an open cross section). Furthermore, the bumper reinforcement member 30 may be formed, for example, by press forming.

According to the first embodiment, connecting portions 21c3, 22c3 (see FIGS. 3, 4) are formed at the bumper attaching portions 21c, 22c, respectively (i.e., the connecting portions 21c3, 22c3 are arranged at vehicle exterior portions of the bumper attaching portions 21c, 22c in the vehicle front-rear direction). The connecting portions 21c3, 22c3 close the openings A of the bumper reinforcement member 30 to thereby restrict the openings A from being expanded. Retaining portions 21c4, 21c4 (see FIGS. 1 to 4) are formed at upper and lower ends of the connecting portion 21c3 so as to protrude from the upper and lower ends of the connecting portion 21c toward a forward direction of the vehicle (toward an exterior side of the vehicle in the vehicle front-rear direction). In addition, retaining portions 22c4, 22c4 (see FIGS. 1 to 4) are formed at upper and lower ends of the connecting portion 22c3 so as to protrude from the upper and lower ends of the connecting portion 22c3 toward the forward direction of the vehicle (toward the exterior side of the vehicle in the vehicle front-rear direction). The retaining portions 21c4, 21c4 include emboss beads 21c4a, 21c4b, 21c4c, 21c4d at edges thereof (see FIG. 8). A bead 21c4e is also formed at a corner between the retaining portion 21c4 and the connecting portion 21c3. The bumper reinforcement member 30 is retained by the retaining portions 21c4, 21c4 and the retaining portions 22c4, 22c4 so as to be sandwiched between the retaining portions 21c4, 21c4 (sandwiching portions) and between the retaining portions 22c4, 22c4 (sandwiching portions). As illustrated in FIG. 3, the bumper reinforcement member 30 includes lower flange portions 30a, 30b positioned at a lower side of the openings A, and upper flange portions 30c, 30d positioned at an upper side of the openings A. The lower flange portion 30a is fixed by the two bolts 31 and the two nuts 21c1 to a lower portion of the connecting portion 21c3 of the bumper attaching portion 21c of the crush box 21. The lower flange portion 30b is fixed by the two bolts 32 and the two nuts 22c1 to a lower portion of the connecting portion 22c3 of the bumper attaching portion 22c of the crush box 22. The upper flange portion 30c is fixed by the bolt 31 and the nut 21c1 to an upper portion of the connecting portion 21c3 of the bumper attaching portion 21c of the crush box 21. The upper flange portion 30d is fixed by the bolt 32 and the nut 22c1 to an upper portion of the connecting portion 22c3 of the bumper attaching portion 22c of the crush box 22. Thus, the crush boxes 21, 22 are integrated with the bumper reinforcement member 30.

According to the aforementioned configuration of the vehicle bumper apparatus described in the first embodiment, the bumper reinforcement member 30 is configured so that the attachment portions configured to be attached to the crush boxes 21, 22 have the hollow cross sections. In addition, the rear end (interior portion) of the bumper reinforcement member 30 in the vehicle front-rear direction is formed so as to have the open cross sections including the openings A. Therefore, the bumper reinforcement member 30 may be downsized in weight. In addition, the crush boxes 21, 22 include the connecting portions 21c3, 22c3, respectively, that close the openings A of the bumper reinforcement member 30 to thereby restrict the openings A from being expanded. As a result, the bumper reinforcement member 30 may be substantially formed to have a closed cross section, thereby increasing the strength of the bumper reinforcement member 30.

Moreover, according to the aforementioned configuration of the vehicle bumper apparatus described in the first embodiment, the crush boxes 21, 22 include the retaining portions 21c4, 21c4 and the retaining portions 22c4, 22c4 that retain the bumper reinforcement member 30 in a manner that the bumper reinforcement member 30 is sandwiched between the retaining portions 21c4, 21c4 and between the retaining portions 22c4, 22c4. As a result, the bumper reinforcement member 30 may be restricted from being deformed, for example, by a small overlap impact or an off-set collision. In addition, the vehicle bumper apparatus according to the first embodiment may obtain a desired performance by a minimum mass. Furthermore, according to the vehicle bumper apparatus of the first embodiment, the effects described above may be obtained by the connecting portion 21c3 and the retaining portions 21c4, 21c4 that are included in the crush box 21, and by the connecting portion 22c3 and the retaining portions 22c4, 22c4 that are included in the crush box 22. Consequently, separate members (additional components) different from the bumper reinforcement member 30 and the crush boxes 21, 22 are not necessary in order to obtain the aforementioned effects; therefore, problems (for example, increases in weight, costs, and the like) caused by the additional components may be restricted from occurring.

According to the first embodiment, the bumper attaching portions 21c, 22c are fixed by welding to the respective front end portions of the main body portions 21a, 22a in the crush boxes 21, 22 as described above. Alternatively, as illustrated in FIGS. 11 to 14, according to a modified example of the first embodiment, a crush box 122 may be configured so that a bumper attaching portion 122c is integrally formed with a front end portion of a main body portion 122a so as to extend from the front end portion thereof. According to the modified example of the first embodiment, a vehicle body attaching portion 122b is fixed by welding to a rear end portion of the main body portion 122a. Alternatively, the vehicle body attaching portion 122b may be integrally formed with the main body portion 122a so as to extend from the rear end portion thereof. As a result, according to the vehicle bumper apparatus of the modified example of the first embodiment, costs for the crush box 122 may be minimized.

Figure 2:
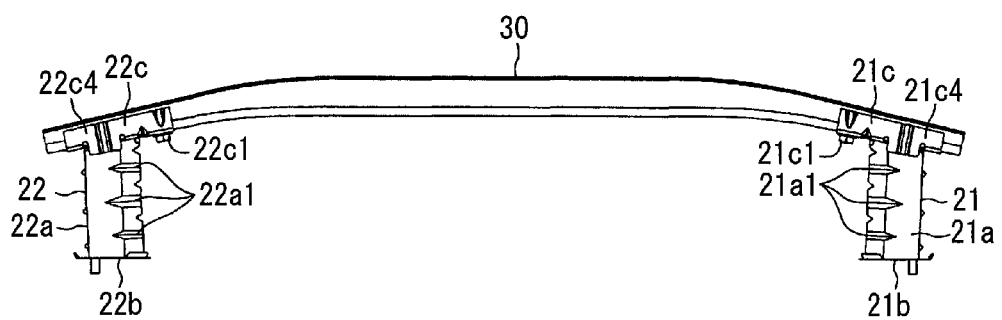
FIG. 2 is a top plan view of crush boxes and a bumper reinforcement member that are illustrated in FIG. 1.
Figure 3:
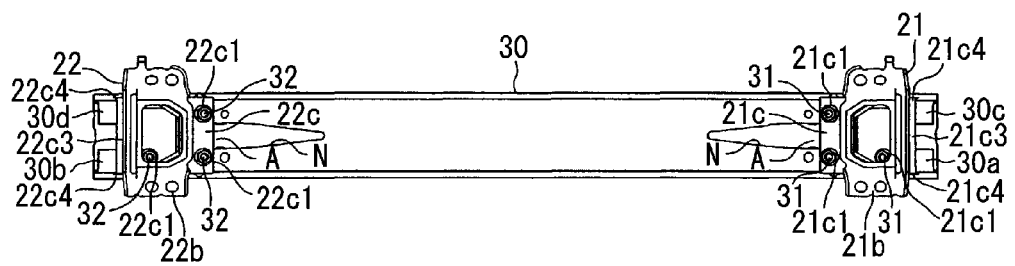
FIG. 3 is a rear view of the crush boxes and the bumper reinforcement member that are illustrated in FIG. 1.
Figure 4:
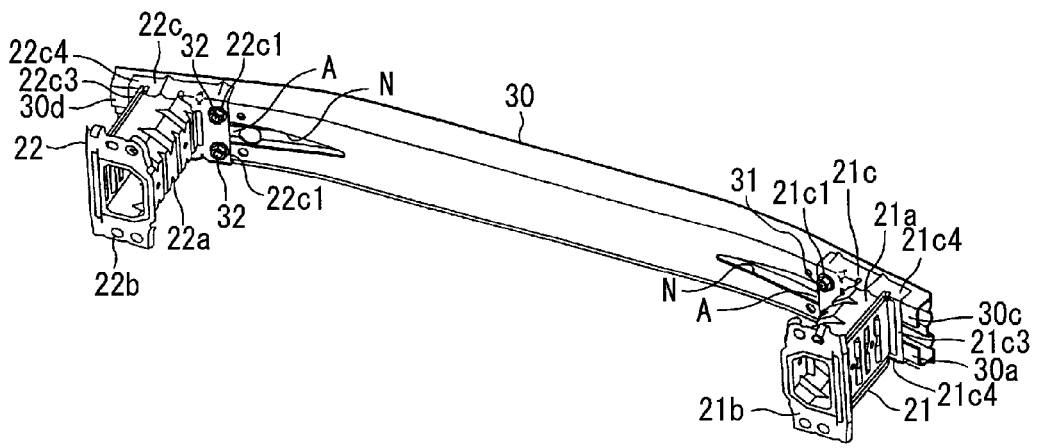
FIG. 4 is a rear perspective view of the crush boxes and the bumper reinforcement member that are illustrated in FIG. 1.
Figure 5:
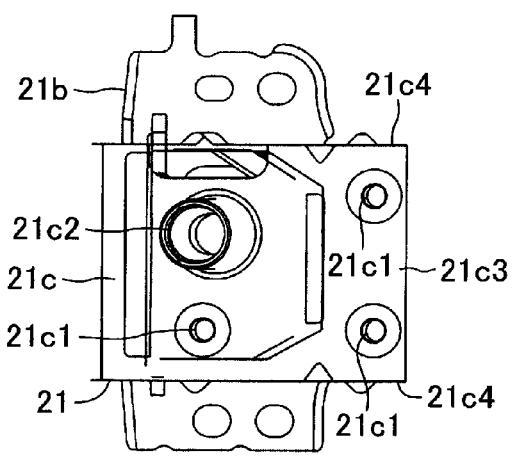
FIG. 5 is a front view of one of the crush boxes illustrated in FIGS. 1 to 4 (the crush box arranged at the right side in FIG. 2)
Figure 6:
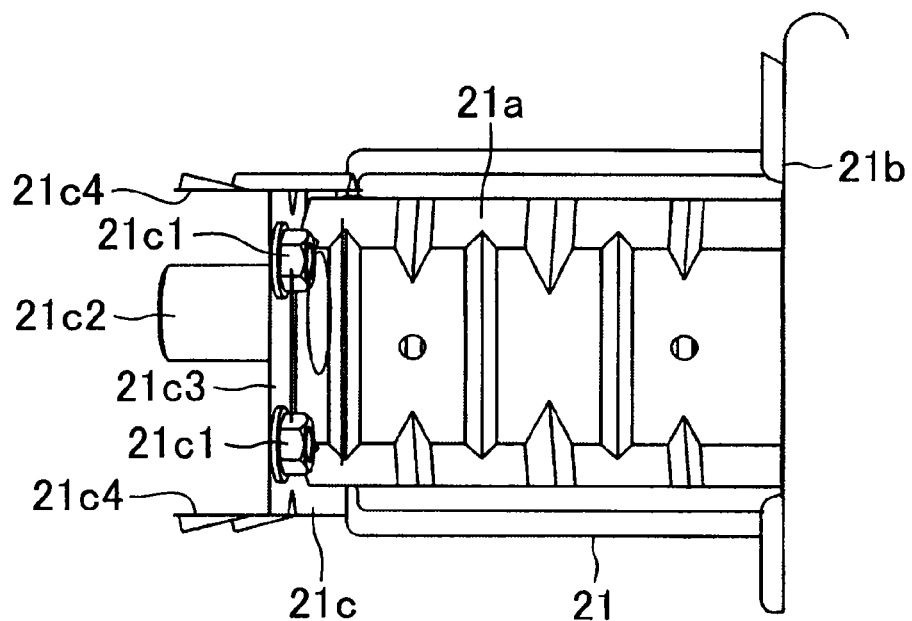
FIG. 6 is a right-side view of the crush box illustrated in FIG. 5.
Figure 7:
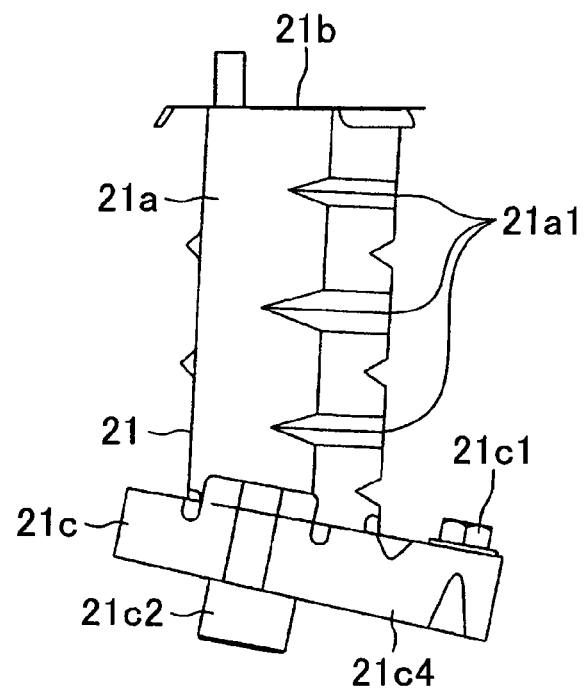
FIG. 7 is a top plan view of the crush box illustrated in FIG. 5.
Figure 8:
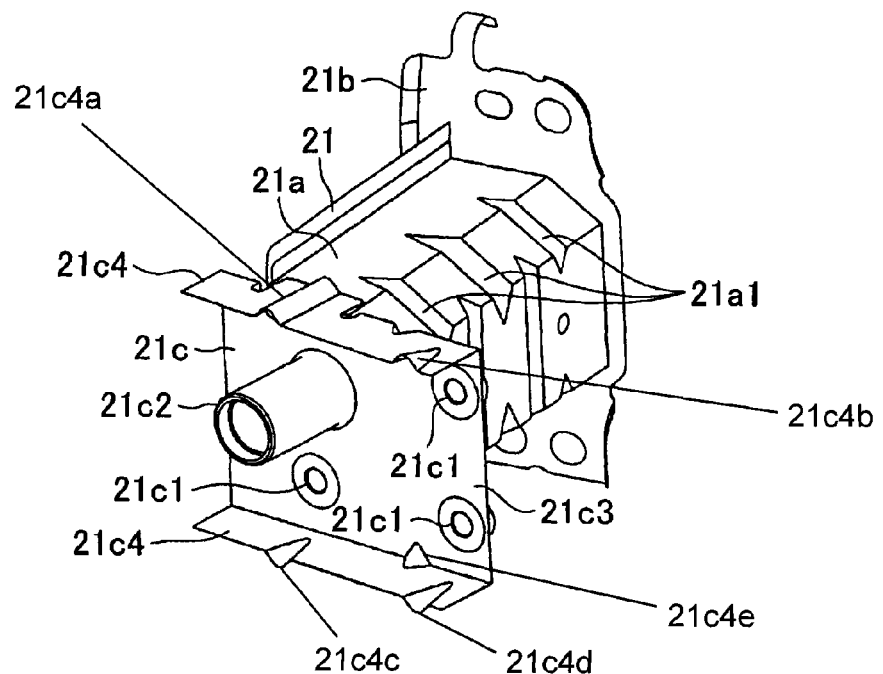
FIG. 8 is a front perspective view of the crush box illustrated in FIG. 5.
Figure 9:
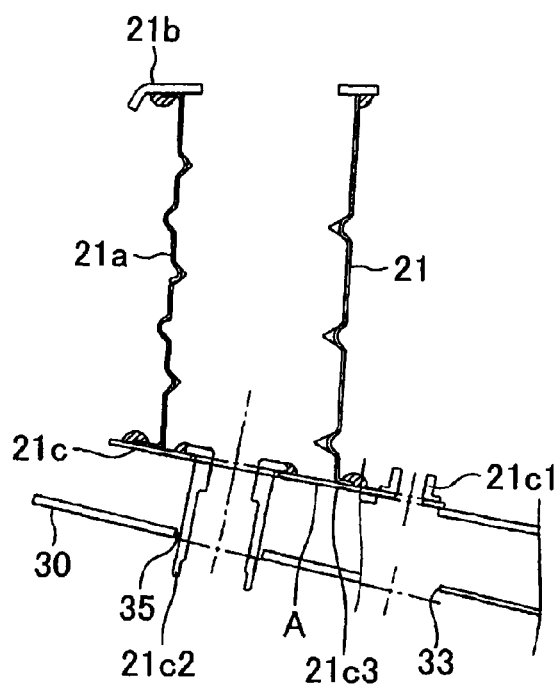
FIG. 9 is a horizontal sectional view mainly illustrating a relation between the bumper reinforcement member and the crush box that is illustrated in FIGS. 1 to 8.
Figure 10:
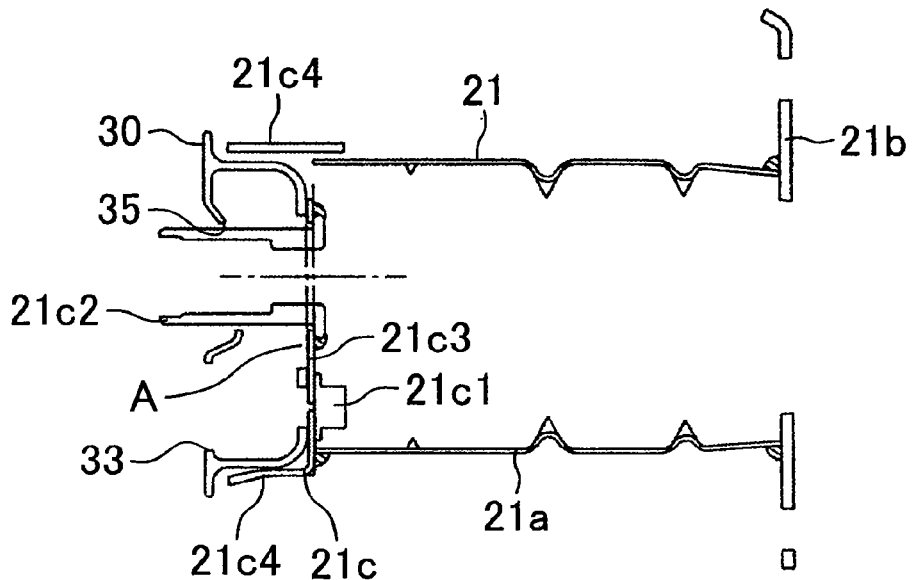
FIG. 10 is a vertical sectional view mainly illustrating the relation between the bumper reinforcement member and the crush box that is illustrated in FIGS. 1 to 8.
Figure 11:
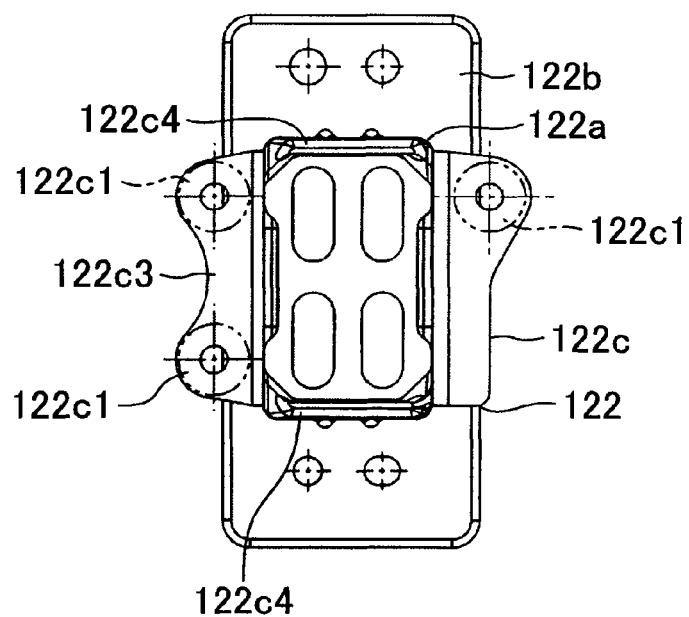
FIG. 11 is a front view of the other one of the crush boxes illustrated in FIGS. 1 to 4 (the crush box at the left side in FIG. 2) according to a modified example of the first embodiment disclosed here.
Figure 12:
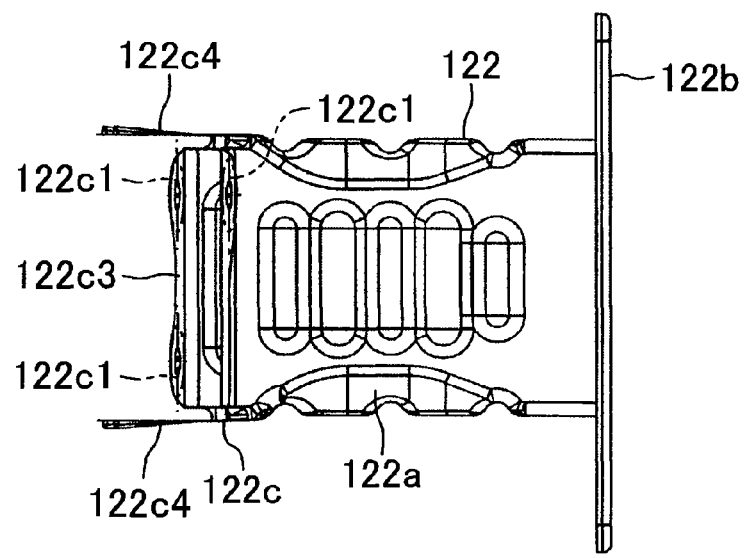
FIG. 12 is a right-side view of the crush box illustrated in FIG. 11.
Figure 13:
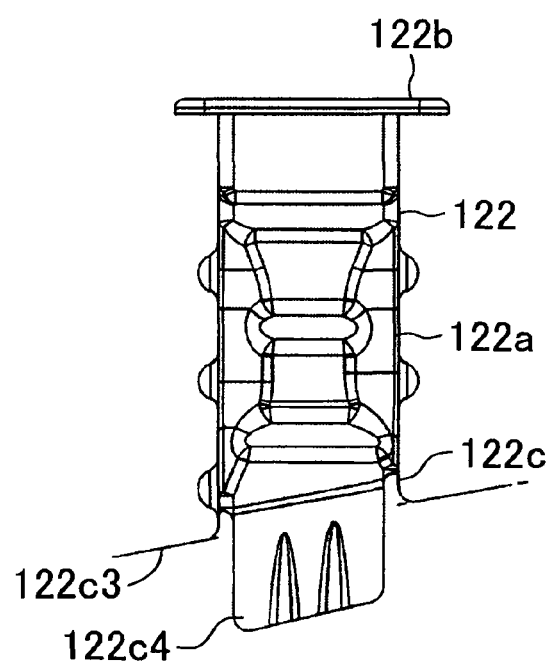
FIG. 13 is a top plan view of the crush box illustrated in FIG. 11.
Figure 14:
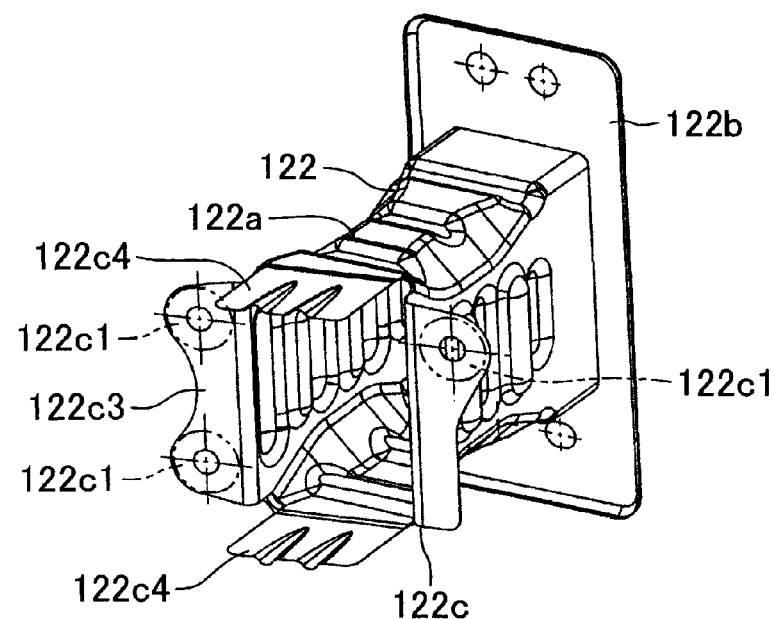
FIG. 14 is a front perspective view of the crush box illustrated in FIG. 11.

The crush box 122 illustrated in FIGS. 11 to 14 according to the modified example of the first embodiment is a crush box that may be applied as substitute for the crush box 22 arranged at the left side in FIG. 2. A fixing nut is not arranged at the crush box 122 according to the modified example of the first embodiment. Other features of the crush box 122 according to the modified example of the first embodiment are substantially the same as the features of the crush box 22 according to the first embodiment and explanations thereof will be therefore omitted herein. In the modified example of the first embodiment, the same numbers in the hundreds will be assigned to the same portions as those of the first embodiment. In addition, effects obtained from the modified example of the first embodiment are substantially the same as those of the first embodiment and explanations thereof will be therefore omitted herein.

Figure 15:
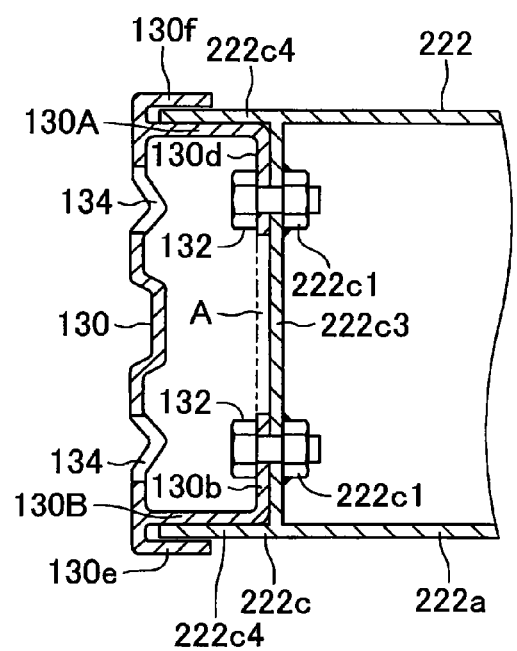
FIG. 15 is a vertical sectional view schematically illustrating a main portion of the vehicle bumper apparatus according to a second embodiment disclosed here.

A second embodiment of the disclosure will be described as follows with reference to FIG. 15. A crush box 222 according to the second embodiment corresponds to the crush box 22 arranged at the left side in FIG. 2. In the second embodiment, the crush box 222 includes a main body portion 222a and a bumper attaching portion 222c (positioned at a front side of the main body portion 222a so as to be integrally formed therewith). The bumper attaching portion 222c is provided with a connecting portion 222c3 and retaining portions 222c4, 222c4 (first and second retaining portions). The connecting portion 222c3 arranged at the bumper attaching portion 222c closes an opening A of a bumper reinforcement member 130 to thereby restrict the opening A from being expanded. The retaining portions 222c4, 222c4 are arranged at upper and lower ends of the connecting portion 222c3 so as to protrude from the upper and lower ends toward the forward direction of the vehicle (toward the exterior side of the vehicle in the vehicle front-rear direction). As a result, the bumper reinforcement member 130 is retained by the retaining portions 222c4, 222c4 (sandwiching portions) so as to be sandwiched therebetween. In particular, the retaining portion 222c4 (the first retaining portion) positioned at an upper side of the connecting portion 222c3 is provided in contact with or adjacent to an upper surface portion 130A (corresponding to a flat surface portion) of the bumper reinforcement member 130. The retaining portion 222c4 (the second retaining portion) positioned at a lower side of the connecting portion 222c3 is provided in contact with or adjacent to a lower surface portion 130B (corresponding to the flat surface portion) of the bumper reinforcement member 130. Thus, the bumper reinforcement member 130 is retained by the retaining portions 222c4, 222c4 so as to be sandwiched therebetween. Here, in a state where the bumper reinforcement member 130 is arranged between the retaining portions 222c4, 222c4, a clearance may be formed between the upper surface portion 130A and the retaining portion 222c4 at the upper side of the connecting portion 222c3 (or between the lower surface portion 130B and the retaining portion 222c4 at the lower side of the connecting portion 222c3).

According to the second embodiment, the bumper reinforcement member 130 includes lower and upper flange portions 130b and 130d positioned at lower and upper sides of the opening A. The lower and upper flange portions 130b and 130d of the bumper reinforcement member 130 are fixedly attached to the connecting portion 222c3 of the crush box 222 by bolts 132 and nuts 222c1. Thus, the crush box 222 is integrated with the bumper reinforcement member 130. In addition, the bolts 132 are screwed with the nuts 222c1 through bolt insertion holes 134 formed in the bumper reinforcement member 130; thereby, the bumper reinforcement member 130 and the crush box 222 are connected to each other Moreover, according to the second embodiment, the bumper reinforcement member 130 includes restriction portions 130e, 130f restricting the retaining portions 222c4, 222c4 from being deformed to be expanded. In particular, the restriction portion 130f is positioned substantially in parallel to the upper surface portion 130A of the bumper reinforcement member 130 and is arranged in contact with or adjacent to the retaining portion 222c4 provided at the upper side of the connecting portion 222c3. The restriction portion 130e is positioned substantially in parallel to the lower surface portion 130B of the bumper reinforcement member 130 and is arranged in contact with or adjacent to the retaining portion 222c4 provided at the lower side of the connecting portion 222c3. Thus, the retaining portion 222c4 arranged at the upper side of the connection portion 222c3 is sandwiched between the restriction portion 130f and the upper surface portion 130A while the retaining portion 222c4 arranged at the lower side of the connecting portion 222c3 is sandwiched between the restriction portion 130e and the lower surface portion 130B. Here, in a state where the retaining portion 222c4 is sandwiched between the restriction portion 130f and the upper surface portion 130A (between the restriction portion 130e and the lower surface portion 130B), a clearance may be formed between the restriction portion 130f and the retaining portion 222c4 (between the restriction portion 130e and the retaining portion 222c4) or a clearance may be formed between the upper surface portion 130A and the retaining portion 222c4 (between the lower surface portion 130B and the retaining portion 222c4). Therefore, for example, in a case where a load is applied to the bumper reinforcement member 130 at the time of a small overlap impact or an off-set collision, the bumper reinforcement member 130 and the crush box 222 may be deformed. At this time, the restriction portions 130e, 130f of the bumper reinforcement member 130 may restrict the retaining portions 222c4, 222c4 of the crush box 222 from being deformed to be expanded. In addition, the bumper reinforcement member 130 may be effectively kept sandwiched by the retaining portions 222c4, 222c4 of the crush box 222. Therefore, for example, in a case where a load is applied to the bumper reinforcement member 130, the bumper reinforcement member 130 and the crush box 222 may be appropriately deformed by the load (i.e., for example, in a case where a load is applied to the bumper reinforcement member 130, the bumper reinforcement member 130 and the crush box 222 may appropriately absorb an impact energy caused by the load applied to the bumper reinforcement member 130).

According to the aforementioned embodiments, the vehicle bumper apparatus is arranged at the front side of the vehicle. Alternatively, the vehicle bumper apparatus according to the aforementioned embodiments may be arranged at a rear side of the vehicle or may be appropriately modified so as to be provided at the rear side of the vehicle.

As described above, according to the aforementioned embodiments, the vehicle bumper apparatus includes the bumper reinforcement member 30, 130 formed to have the hollow cross section and including the vehicle interior portion formed to have the open cross sections including the openings A, and the crush boxes 21, 22, 122, 222 supporting the bumper reinforcement member 30, 130 to mount the bumper reinforcement member 30, 130 to the side members 11, 12 of the vehicle body. Each of the crush boxes 21, 22, 122, 222 includes the connecting portion 21c3, 22c3, 122c3, 222c3 arranged at the vehicle exterior portion, the connecting portion 21c3, 22c3, 122c3, 222c3 closing each of the openings A of the bumper reinforcement member 30, 130 to restrict the opening A from being expanded, and the retaining portion 21c4, 22c4, 122c4, 222c4 protruding from the connecting portion 21c3, 22c3, 122c3, 222c3 toward the exterior side of the vehicle to retain the bumper reinforcement member 30, 130.

In the vehicle bumper apparatus according to the aforementioned embodiments, the bumper reinforcement member 30, 130 is configured to include the vehicle interior portion having the open cross sections including the openings A, therefore being downsized in weight. In addition, the crush box 21, 22, 122, 222 includes the connecting portion 21c3, 22c3, 122c3, 222c3 closing each of the openings A to thereby restrict the opening A from being expanded. Consequently, the bumper reinforcement member 30, 130 may be substantially formed to have the closed cross section; therefore, the strength of the bumper reinforcement member 30, 130 may be increased. The crush box 21, 22, 122, 222 further includes the retaining portion 21c4, 22c4, 122c4, 222c4 retaining the bumper reinforcement member 30, 130. Accordingly, for example, even in a case where a load is applied to the bumper reinforcement member 30, 130 at the time of a small overlap impact or an off-set collision, deformation of the bumper reinforcement member 30, 130 may be minimized and the vehicle bumper apparatus according to the aforementioned embodiments may obtain a desired performance by a minimum mass. Furthermore, according to the vehicle bumper apparatus of the aforementioned embodiments, the effects described above may be obtained by the connecting portion 21c3, 22c3, 122c3, 222c3 and the retaining portion 21c4, 22c4, 122c4, 222c4 that are included in the crush box 21, 22, 122, 222. Consequently, separate members (additional components) different from the bumper reinforcement member 30, 130 and the crush box 21, 22, 122, 222 are not necessary; therefore, problems (for example, increases in weight, costs, and the like) caused by the additional components may be restricted from occurring.

According to the aforementioned second embodiment, the bumper reinforcement member 130 includes the upper and lower surface portions 130A, 130B. The retaining portion 222c4 includes the first retaining portion 222c4 protruding from the upper end of the connecting portion 222c3, and the second retaining portion 222c4 protruding from the lower end of the connecting portion 222c3. The first retaining portion 222c4 is arranged adjacent to the upper surface portion 130A of the bumper reinforcement member 130. The second retaining portion 222c4 is arranged adjacent to the lower surface portion 130B of the bumper reinforcement member 130.

According to the aforementioned configuration, the bumper reinforcement member 130 may be effectively kept sandwiched by the retaining portions (first and second retaining portions) 222c4, 222c4 of the crush box 222. Therefore, even in a case where a load is applied to the bumper reinforcement member 130, the bumper reinforcement member 130 and the crush box 222 may be appropriately deformed by the load (i.e., for example, in a case where a load is applied to the bumper reinforcement member 130, the bumper reinforcement member 130 and the crush box 222 may appropriately absorb an impact energy caused by the load applied to the bumper reinforcement member 130).

According to the aforementioned second embodiment, the bumper reinforcement member 130 includes the restriction portions 130e, 130f restricting the retaining portions 222c4, 222c4 from being deformed to be expanded.

According to the aforementioned configuration, for example, in a case where a load is applied to the bumper reinforcement member 130 to be therefore deformed, the restriction portions 130e, 130f of the bumper reinforcement member 130 may restrict the retaining portions 222c4, 222c4 of the crush box 222 from being deformed to be expanded.

According to the aforementioned second embodiment, the restriction portion 130e, 130f holds the retaining portion 222c4 so that the retaining portion 222c4 is sandwiched between the restriction portion 130f, 130e and at least one of the upper surface portion 130A and the lower surface portion 130B of the bumper reinforcement member 130.

According to the aforementioned configuration, for example in a case where a load is applied to the bumper reinforcement member 130 at the time of a small overlap impact or an off-set collision, the bumper reinforcement member 130 and the crush box 222 may be deformed. At this time, the restriction portion 130e, 130f of the bumper reinforcement member 130 may restrict the retaining portion 222c4 of the crush box 222 from being deformed to be expanded.

According to the aforementioned embodiments, the crush box 21, 22, 122, 222 is arranged between the side member 11, 21 of the vehicle body and the bumper reinforcement member 30, 130 formed to have the hollow cross section and including the vehicle interior portion formed to have the open cross sections including the openings A. The crush box 21, 22, 122, 222 includes the connecting portion 21c3, 22c3, 122c3, 222c3 closing each of the openings A to restrict the opening A from being expanded, and the retaining portion 21c4, 22c4, 122c4, 222c4 protruding from the connecting portion 21c3, 22c3, 122c3, 222c3 to the exterior side of the vehicle to retain the bumper reinforcement member 30, 130.

According to the aforementioned configuration of the crush box 21, 22, 122, 222, the connecting portion 21c3, 22c3, 122c3, 222c3 closes the opening A of the bumper reinforcement member 30, 130 to thereby restrict the opening A from being expanded. Consequently, the bumper reinforcement member 30, 130 may be substantially formed to have the closed cross section; thereby, the strength of the bumper reinforcement member 30, 130 may be increased. Furthermore, according to the aforementioned configuration of the crush box 21, 22, 122, 222, the retaining portion 21c4, 22c4, 122c4, 222c4 retains the bumper reinforcement member 30, 130. Accordingly, for example, even in a case where a load is applied to the bumper reinforcement member 30, 130 at the time of a small overlap impact or an off-set collision, deformation of the bumper reinforcement member 30, 130 may be minimized. In addition, the vehicle bumper apparatus according to the aforementioned embodiments may obtain a desired performance by a minimum mass.

According to the aforementioned second embodiment, the retaining portion 222c4 includes the first retaining portion 222c4 protruding from the upper end of the connecting portion 222c3, and the second retaining portion 222c4 protruding from the lower end of the connecting portion 222c3. The first retaining portion 222c4 is arranged adjacent to the upper surface portion 130A of the bumper reinforcement member 130. The second retaining portion 222c4 is arranged adjacent to the lower surface portion 130B of the bumper reinforcement member 130.

According to the aforementioned configuration, the bumper reinforcement member 130 may be effectively kept sandwiched by the retaining portions (first and second retaining portions) 222c4, 222c4 of the crush box 222. Therefore, even in a case where a load is applied to the bumper reinforcement member 130, the bumper reinforcement member 130 and the crush box 222 may be appropriately deformed by the load (i.e., for example, in a case where a load is applied to the bumper reinforcement member 130, the bumper reinforcement member 130 and the crush box 222 may appropriately absorb an impact energy caused by the load applied to the bumper reinforcement member 130).

According to the aforementioned second embodiment, the retaining portion 222c4 is arranged between the flat surface portion 130A, 130B and the restriction portion 130f, 130e of the bumper reinforcement member 130 so as to be supported by the flat surface portion 130A, 130B and the restriction portion 130f, 130e. The restriction portion 130e, 130f is arranged at the bumper reinforcement member 130 to restrict the retaining portion 222c4 from being deformed to be expanded.

According to the aforementioned configuration, for example in a case where a load is applied to the bumper reinforcement member 130 at the time of a small overlap impact or an off-set collision, the bumper reinforcement member 130 and the crush box 222 may be deformed. At this time, the restriction portion 130e, 130f of the bumper reinforcement member 130 may restrict the retaining portion 222c4 of the crush box 222 from being deformed to be expanded.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle bumper apparatus, comprising:
    a bumper reinforcement member formed to have a hollow cross section and including a vehicle interior portion formed to have an open cross section including an opening, the bumper reinforcement member including an extending portion extending in a vertical direction of the vehicle; and
    a crush box supporting the bumper reinforcement member to mount the bumper reinforcement member to a side member of a vehicle body, the crush box comprising:
        a main body portion formed in a tubular shape;
        a connecting portion arranged at a vehicle exterior portion, the connecting portion closing the opening of the bumper reinforcement member to restrict the opening from being expanded;
        a retaining portion protruding from the connecting portion toward an exterior side of a vehicle to retain the bumper reinforcement member; and
        an emboss bead provided at an edge of the retaining portion, the emboss bead protruding in the vertical direction and formed open, facing to the extending portion of the bumper reinforcement member.

2. The vehicle bumper apparatus according to claim 1, wherein the bumper reinforcement member includes upper and lower surface portions, and
    wherein the retaining portion includes a first retaining portion protruding from an upper end of the connecting portion, and a second retaining portion protruding from a lower end of the connecting portion, the first retaining portion being arranged adjacent to the upper surface portion of the bumper reinforcement member, the second retaining portion being arranged adjacent to the lower surface portion of the bumper reinforcement member.

3. The vehicle bumper apparatus according to claim 1, wherein the bumper reinforcement member includes a restriction portion restricting the retaining portion from being deformed to be expanded.

4. The vehicle bumper apparatus according to claim 2, wherein the bumper reinforcement member includes a restriction portion restricting the retaining portion from being deformed to be expanded.

5. The vehicle bumper apparatus according to claim 4, wherein the restriction portion holds the retaining portion so that the retaining portion is sandwiched between the restriction portion and at least one of the upper surface portion and the lower surface portion of the bumper reinforcement member.

6. The vehicle bumper apparatus according to claim 1, wherein the crush box includes:
   the emboss bead including a plurality of emboss beads;
   a corner portion provided between the connecting portion and the retaining portion; and
   a bead provided between the emboss beads, the bead being provided at the corner portion.

7. The vehicle bumper apparatus according to claim 1, wherein the crush box includes a fixing nut; and
   the bumper reinforcement member includes a flat surface portion, the flat surface portion being provided between the retaining portion and the fixing nut.

* * * * *

UNITED STATES PATENT AND TRADEMARK OFFICE
CERTIFICATE OF CORRECTION

Page 1 of 1

PATENT NO.        : 8,844,986 B2
APPLICATION NO.   : 13/653695
DATED             : September 30, 2014
INVENTOR(S)       : Takanobu Kaneko et al.

It is certified that error appears in the above-identified patent and that said Letters Patent is hereby corrected as shown below:

On the title page, Item (71) 1st applicant's name spelled incorrectly. Item (71) should read:

--(71) Applicants: Aisin Seiki Kabushiki Kaisha, Kariya (JP);
　　　　　　　　　　Aisin Keikinzoku Kabushiki Kaisha, Imizu (JP)--

Signed and Sealed this
Thirteenth Day of January, 2015

Michelle K. Lee
*Deputy Director of the United States Patent and Trademark Office*